United States Patent
Yamaguchi et al.

(10) Patent No.: US 8,388,328 B2
(45) Date of Patent: Mar. 5, 2013

(54) ROTARY PUMP AND BRAKE DEVICE IN WHICH ROTARY PUMP IS PROVIDED

(75) Inventors: Takahiro Yamaguchi, Kariya (JP); Hiroyuki Shinkai, Obu (JP); Takutou Takahashi, Nishio (JP); Kazunori Uchiyama, Okazaki (JP); Naoki Hakamada, Anjo (JP)

(73) Assignees: Advics Co., Ltd., Aichi-pref. (JP); Nippon Soken, Inc., Nishio (JP)

(*) Notice: Subject to any disclaimer, the term of this patent is extended or adjusted under 35 U.S.C. 154(b) by 744 days.

(21) Appl. No.: 12/555,396

(22) Filed: Sep. 8, 2009

(65) Prior Publication Data
US 2010/0060074 A1 Mar. 11, 2010

(30) Foreign Application Priority Data
Sep. 10, 2008 (JP) ................... 2008-231840

(51) Int. Cl.
*F03C 4/00* (2006.01)
*F04C 18/00* (2006.01)
*F04C 2/00* (2006.01)

(52) U.S. Cl. ............ 418/171; 418/75; 418/79; 418/104; 418/132; 303/116.4; 277/361

(58) Field of Classification Search .............. 418/166, 418/171, 75, 79, 102, 104, 132; 303/116.4; 277/361, 369, 589
See application file for complete search history.

(56) References Cited

U.S. PATENT DOCUMENTS

| | | | |
|---|---|---|---|
| 6,273,527 B1 | 8/2001 | Yamaguchi et al. | |
| 6,715,847 B2 * | 4/2004 | Yamaguchi et al. | 418/171 |
| 6,783,193 B2 * | 8/2004 | Yamaguchi et al. | 418/171 |
| 6,905,321 B2 * | 6/2005 | Uchiyama et al. | 418/171 |
| 2006/0093507 A1 * | 5/2006 | Yamaguchi et al. | 418/171 |
| 2007/0231177 A1 * | 10/2007 | Yamaguchi et al. | 418/131 |

FOREIGN PATENT DOCUMENTS
JP 2000-355274 A 12/2000

* cited by examiner

*Primary Examiner* — Theresa Trieu
(74) *Attorney, Agent, or Firm* — Posz Law Group, PLC

(57) ABSTRACT

In an inner wall surface of a casing, grooves are formed that correspond to end faces of an outer rotor and an inner rotor, and seal members are disposed within the grooves, the seal members presses against the end faces of the outer rotor and the inner rotor. Inclined portions are provided in sealing portions of resin members of seal members, the sealing portions covering a closed portion. With this configuration, an internal pressure in the closed portion causes the inclined portions to separate from an outer rotor and an inner rotor when a brake fluid pressure within the closed portion increases to the point that the brake fluid is excessively compressed, releasing the brake fluid that is inside the closed portion. It is therefore possible to prevent the brake fluid pressure from increasing excessively within the closed portion.

10 Claims, 8 Drawing Sheets

ROTARY PUMP AND BRAKE DEVICE IN WHICH ROTARY PUMP IS PROVIDED

CROSS REFERENCE TO RELATED APPLICATION

This application is based upon and claims the benefit of Japanese Patent Application No. 2008-231840 filed on Sep. 10, 2008, the content of which are incorporated herein by reference.

BACKGROUND OF THE INVENTION

1. Field of the Invention

The present invention relates to a rotary pump that sucks and discharges a fluid and to a brake device in which the rotary pump is provided, the present invention being particularly suitable for application to an internal gear pump such as a trochoid pump or the like.

2. Description of the Related Art

An internal gear type of rotary pump, such as a trochoid pump or the like, is configured from an inner rotor that is provided with an external tooth portion on its outer circumference, an outer rotor that is provided with an internal tooth portion on its inner circumference, a casing that houses the inner rotor and the outer rotor, and the like. The inner rotor and the outer rotor are disposed within the casing in a state in which the internal tooth portion and the external tooth portion mesh with one another such that a plurality of chambers is formed by the teeth.

A structure for this sort of rotary pump has been disclosed in which, in an inner wall surface of the casing, grooves are formed that correspond to end faces of the outer rotor and the inner rotor, and seal members are disposed within the grooves, the seal members pressing against the end faces of the outer rotor and the inner rotor (refer to Japanese Patent Application Publication No. JP-A-2000-355274). Openings in the inner wall surface of the casing and the end faces of the outer rotor and the inner rotor are thus sealed between a high pressure location and a low pressure location, preventing a brake fluid leak from the high pressure location to the low pressure location.

However, with the known seal structure that is described above, the seal surface pressure tends to increase, and the brake fluid pressure increases excessively within a closed portion among the plurality of chambers that is not continuous with either one of a suction port and a discharge port. This creates a problem in that, when the brake fluid is discharged from the discharge port while the closed portion is continuous with the discharge port, a discharge pulsation increases, which in turn increases noise. An additional problem is created in that the excessive increase in the brake fluid pressure within the closed portion causes the locations where tooth tips of the internal tooth portion of the outer rotor and the external tooth portion of the inner rotor come into contact to be pushed open by internal pressure, giving rise to brake fluid leakage around the tooth tips.

SUMMARY OF THE INVENTION

The present invention addresses these issues and, by preventing the brake fluid pressure within the closed portion from increasing excessively, suppresses the increase in noise that is caused by the increase in the discharge pulsation and prevents the fluid leakage around the tooth tips of the internal tooth portion of the outer rotor and the external tooth portion of the inner rotor.

In order to address these issues, according to a first aspect of the present invention, a rotary pump is provided in which, a seal element is provided that is disposed within a seal groove portion that is formed in a surface of a casing that faces axial direction end faces of the inner rotor and the outer rotor. The seal element is disposed in a gap between the casing and the axial direction end faces of the inner rotor and the outer rotor, extending through a gap between the discharge port and a drive shaft, extending through the closed portion, and reaching the periphery of the outer rotor. The seal element includes a sealing portion that covers the closed portion. In the sealing portion of the seal element, a thin-walled portion is provided that makes the axial direction thicknesses of the sealing portion thinner in the area that come into contact with the axial direction end face of the outer rotor than in the area that come into contact with the axial direction end face of the inner rotor, such that the area on the outer rotor side of the sealing portion separates from the outer rotor as an internal pressure of the closed portion increases.

In the rotary pump that is thus configured, if the brake fluid pressure within the closed portion increases to the point that the brake fluid is excessively compressed, in the places where the sealing portion is formed, the sealing portion separates from the outer rotor and the inner rotor, releasing the fluid that is inside the closed portion. It is therefore possible to prevent the brake fluid from leaking from the high pressure portion to the low pressure portion, as well as to prevent the internal pressure in the closed portion from increasing excessively. Because it is possible to keep the internal pressure within the closed portion from becoming too high, it is also possible to prevent the discharge pulsation from increasing when the brake fluid is discharged from the discharge port, thus preventing the problem of increased noise, so the rotary pump is made quieter. In addition, it is possible to prevent the internal pressure in the closed portion from pushing open the locations where the tooth tips of the internal tooth portion of the outer rotor and the external tooth portion of the inner rotor come into contact, which in turn makes it possible to prevent the fluid from leaking around the tooth tips from the high pressure portion to the low pressure portion.

For example, according to a second aspect of the present invention, the thin-walled portion may be configured as an inclined portion that is formed in the sealing portion in position that faces the axial direction end faces of the inner rotor and the outer rotor.

Configuring the inclined portion in this manner makes the surface pressure that presses against the end face of the outer rotor and the inner rotor lower than in the known structure, so the inclined portion can be separated from the outer rotor and the inner rotor by the internal pressure in the closed portion, and the fluid inside the closed portion can be released to the outside.

In this case, according to a third aspect of the present invention, for example, the inclined portion may be inclined such that the thicknesses of the sealing portion become thinner toward either an outer side of the sealing portion in the radial direction or the discharge port side along outer circumference of the sealing portion, with the drive shaft serving as a center.

Further, according to a fourth aspect of the present invention, the thin-walled portion may be configured by forming a counterbore portion in a rear side of the sealing portion that is on the opposite side from the side that faces the axial direction end faces of the inner rotor and the outer rotor.

Forming the counterbore portion in this manner can reduce the rigidity of the sealing portion, so the sealing portion can be flexed by the internal pressure in the closed portion, separating the sealing portion from the outer rotor and the inner rotor such that the fluid inside the closed portion can be released to the outside.

According to a fifth aspect of the present invention, the seal groove portion and the seal element may be formed into ring shapes and may be disposed eccentrically in relation to the drive shaft, with one of the suction port and the discharge port being disposed on the inner circumference side of the seal element, and the other of the suction port and the discharge port being disposed on the outer circumference side of the seal element.

Making the seal element ring-shaped in this manner makes it possible to provide the sealing all the way around the central axis of rotation of the outer rotor and the inner rotor. This in turn makes it possible for the thin-walled portion to be provided on one side of the seal element in the radial direction and for the displaceable thin-walled portion to be formed easily.

It is preferable for the rotary pump that is described above to be used in a brake device that uses a high fluid pressure. Specifically, according to a sixth aspect of the present invention, a brake device is provided that includes brake fluid pressure generating elements, braking force generation elements, a main hydraulic conduit, and an auxiliary hydraulic conduit. The brake fluid pressure generating elements generate a brake fluid pressure based on a pedal force. The braking force generation elements generate braking forces on wheels based on the brake fluid pressure. The main hydraulic conduit is connected to the brake fluid pressure generating elements and transmits the brake fluid pressure to the braking force generation elements. The auxiliary hydraulic conduit is connected to the brake fluid pressure generating elements and supplies the brake fluid to the main hydraulic conduit in order to increase the braking forces that the braking force generation elements generate. The rotary pump is disposed in the brake device such that the suction port can take in the brake fluid on the brake fluid pressure generating elements side through the auxiliary hydraulic conduit and the discharge port can discharge the brake fluid toward the braking force generation elements through the main hydraulic conduit.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
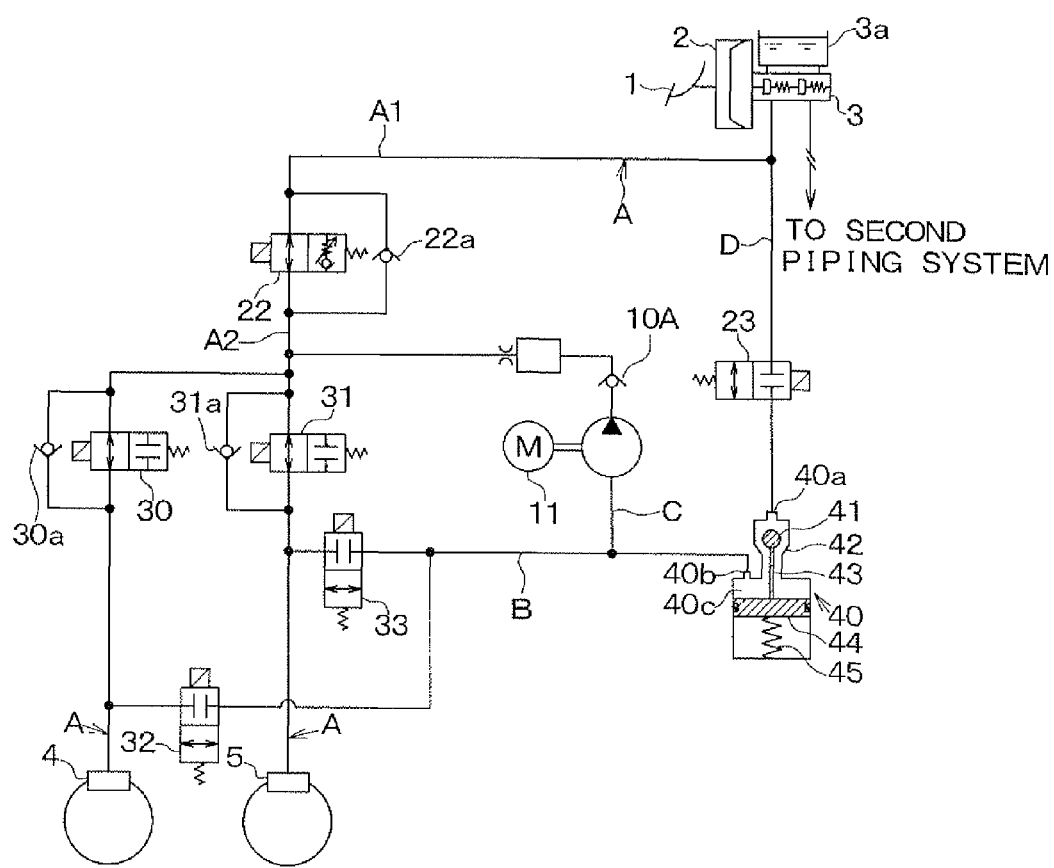
FIG. 1 is a hydraulic configuration diagram of a brake device in which is provided a rotary pump according to a first embodiment of the present invention.

Hereinafter, preferred embodiments of the present invention will be explained based on the appended drawings. Note that elements that are the same or equivalent in each of the embodiments that are explained below are denoted by the same reference numerals in the drawings.

First Embodiment

First, a basic configuration of a brake device will be explained based on FIG. 1. An example will be explained in which a brake device according to the present invention is used in a four-wheeled vehicle with front wheel drive, in which the hydraulic circuit is a diagonally-split brake system that is provided with separate piping systems for connecting the right front wheel and left rear wheel and connecting the left front wheel and right rear wheel, but the brake device can also be used with separate front and rear piping systems and the like.

As shown in FIG. 1, a brake pedal 1 is connected to a brake booster 2, and a brake pedal force or the like is multiplied by the brake booster 2.

The brake booster 2 includes a push rod or the like that transmits the multiplied pedal force to a master cylinder 3, and the push rod generates a master cylinder pressure by pressing on a master piston that is provided in the master cylinder 3. Note that the brake pedal 1, the brake booster 2, and the master cylinder 3 are equivalent to brake fluid pressure generating elements.

A master reservoir 3a that supplies brake fluid to the master cylinder 3 and accommodates surplus brake fluid from the master cylinder 3 is connected to the master cylinder 3. The master cylinder pressure is transmitted, through a brake fluid pressure control actuator that performs ABS control and the like, to a wheel cylinder 4 for a right front wheel FR and to a wheel cylinder 5 for a left rear wheel RL that serve as braking force generation elements.

The following explanation explains about the right front wheel FR and the left rear wheel RL, but a left front wheel FL and a right rear wheel RR for which a second piping system is provided are exactly the same, so an explanation of the left front wheel FL and the right rear wheel RR will be omitted.

The brake device includes a hydraulic conduit (a main hydraulic conduit) A that is connected to the master cylinder 3, and a linear differential pressure control valve 22 is provided in the hydraulic conduit A, along with a check valve 22a. The hydraulic conduit A is divided into two portions by the linear differential pressure control valve 22. Specifically, the hydraulic conduit A is divided into a hydraulic conduit A1 that runs from the master cylinder 3 to the linear differential pressure control valve 22 and receives the master cylinder pressure and a hydraulic conduit A2 that runs from the linear differential pressure control valve 22 to the wheel cylinders 4, 5.

The linear differential pressure control valve 22 is normally open, but when the master cylinder pressure is less than a specified pressure, the linear differential pressure control valve 22 enters a state (a differential pressure state) that causes a specified differential pressure to be generated between the master cylinder side and the wheel cylinder side when sudden braking is applied to the wheel cylinders 4, 5 and when traction control is being performed. In the linear differential pressure control valve 22, a set value for the differential pressure can be linearly adjusted.

In the hydraulic conduit A2, the hydraulic conduit A branches into two parts, with one part being provided with a first pressure increase control valve 30 that controls a boost in the brake fluid pressure to the wheel cylinder 4 and the other part being provided with a second pressure increase control valve 31 that controls a boost in the brake fluid pressure to the wheel cylinder 5.

The first and second pressure increase control valves 30, 31 are configured as two-position valves whose open and closed states can be controlled by an electronic control unit (hereinafter called the ECU). When the pressure increase control valves 30, 31 are controlled such that they are in an open state, the brake fluid pressure can be respectively applied to the wheel cylinders 4, 5 by one of the master cylinder pressure and a discharge from a rotary pump 10 that will be described later. The first and second pressure increase control valves 30, 31 are controlled such that they are always in an open state during normal braking for which the ABS control is not being performed.

Note that pressure relief valves 30a, 31a are provided in parallel to the first and second pressure increase control valves 30, 31, respectively, such that the brake fluid is removed from the wheel cylinders 4, 5 side when the brake pedal ceases to be pressed and the ABS control ends.

Pressure decrease control valves 32, 33 whose open and closed states can be controlled by the ECU are provided in a hydraulic conduit (an intake hydraulic conduit) B that connects a pressure regulation reservoir 40 to the hydraulic conduit A between the first and second pressure increase control valves 30, 31 and the wheel cylinders 4, 5, for which the pressure decrease control valves 32, 33 are respectively provided. The pressure decrease control valves 32, 33 are always kept in a closed state during a normal braking state (when the ABS is not operating).

The rotary pump 10 is provided in a hydraulic conduit (a circulation hydraulic conduit) C that connects the pressure regulation reservoir 40 to the hydraulic conduit A between the first and second pressure increase control valves 30, 31 and the linear differential pressure control valve 22. A check valve 10A is provided on a discharge outlet side of the rotary pump 10 such that the brake fluid does not flow backward. A motor 11 is connected to the rotary pump 10, and the rotary pump 10 is driven by the motor 11.

A hydraulic conduit (an auxiliary hydraulic conduit) D is provided such that the master cylinder 3 is connected to the pressure regulation reservoir 40. A two-position valve 23 is provided in the hydraulic conduit D such that the two-position valve 23 is normally in a closed state and the hydraulic conduit D is closed. When the two-position valve 23 is in an open state and the hydraulic conduit D is in an open state, such as when brake assist is being performed, traction control is being performed, and the like, the rotary pump 10 draws the brake fluid from the hydraulic conduit A1 and discharges it into the hydraulic conduit A2, such that the wheel cylinder pressure in the wheel cylinders 4, 5 becomes greater than the master cylinder pressure and the wheel braking force is increased. Note that at this time, the differential pressure between the master cylinder pressure and the wheel cylinder pressure is maintained by the linear differential pressure control valve 22.

The pressure regulation reservoir 40 is provided with a reservoir hole 40a and a reservoir hole 40b. The reservoir hole 40a is connected to the hydraulic conduit D and sucks the brake fluid from the master cylinder 3 side. The reservoir hole 40b is connected to the hydraulic conduit B and the hydraulic conduit C and sucks the brake fluid that is released from the wheel cylinders 4, 5. A ball valve 41 is provided on the inner side of the reservoir hole 40a. A rod 43 that has a specified stroke for moving the ball valve 41 up and down is provided for the ball valve 41 as a separate piece from the ball valve 41.

A piston 44 and a spring 45 are provided inside a reservoir chamber 40c. The piston 44 moves in conjunction with the rod 43, and the spring 45 generates a force that pushes the piston 44 toward the ball valve 41 such that the brake fluid within the reservoir chamber 40c is pushed out.

When the pressure regulation reservoir 40 that is configured in this manner has accommodated a specified amount of the brake fluid, the ball valve 41 is seated in a valve seat 42, such that the brake fluid cannot flow into the pressure regulation reservoir 40. This means that an amount of the brake fluid that will exceed the intake capacity of the rotary pump 10 does not flow into the reservoir chamber 40c, and an excessively high pressure is not imposed on the intake side of the rotary pump 10.

Figure 2A:
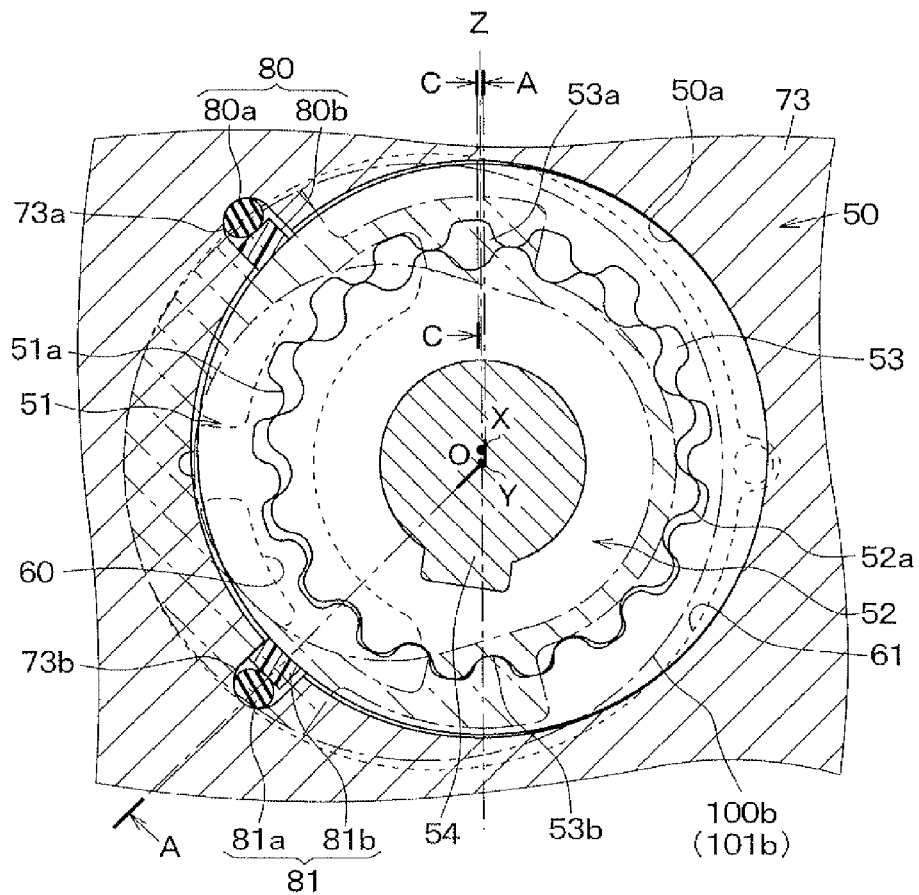
FIG. 2A is a schematic view that shows a detailed configuration of the rotary pump 10.
Figure 2B:
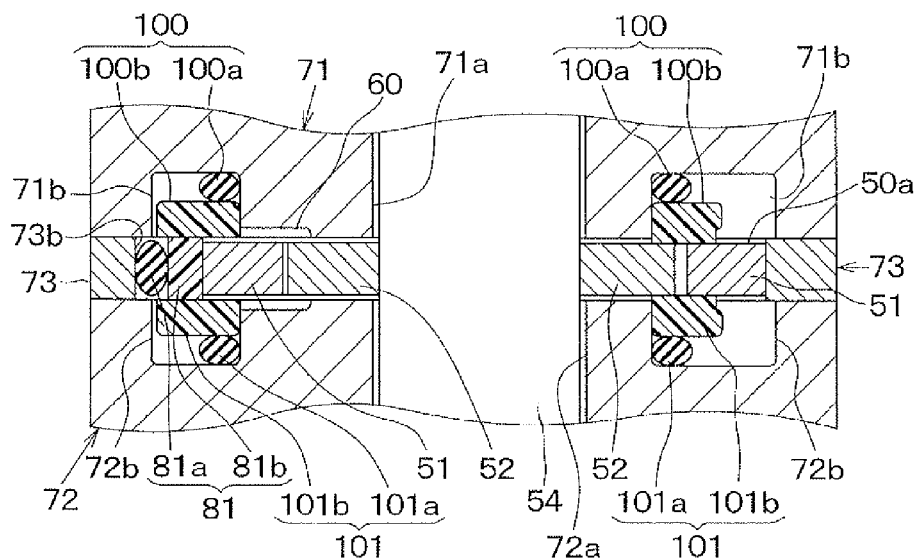
FIG. 2B is a sectional view of the rotary pump along a line A-0-A in FIG. 2A.

A configuration of the rotary pump 10 will be explained based on FIGS. 2A and 2B, FIG. 2A showing a schematic view of the rotary pump 10 and FIG. 2B showing a sectional view along a line A-0-A in FIG. 2A.

In the rotary pump 10, an outer rotor 51 and an inner rotor 52 are mounted and accommodated within a rotor chamber 50a of a casing 50 such that the central axes of the rotors (a point X and a point Y in FIG. 2A) are each in an eccentric state. An internal tooth portion 51a is provided in the outer rotor 51, and an external tooth portion 52a is provided in the inner rotor 52. The outer rotor 51 and the inner rotor 52 mesh with one another such that a plurality of chamber portions 53 is formed by the internal and the external tooth portions 51a, 52a. Note that, as can be seen in FIG. 2A, the rotary pump 10 is a trochoid type of pump with a plurality of teeth and without a divider plate (a crescent), in which the plurality of chamber portions 53 is formed by the internal tooth portion 51a of the outer rotor 51 and the external tooth portion 52a of the inner rotor 52. The inner rotor 52 and the outer rotor 51 also have a plurality of contact points in order to transmit a rotary torque of the inner rotor 52.

As shown in FIG. 2B, the casing 50 is configured from a first side plate portion 71, a second side plate portion 72, and a center plate portion 73. The first side plate portion 71 and the second side plate portion 72 are disposed such that they enclose the outer and the inner rotors 51, 52 from opposite sides. The center plate portion 73 is disposed between the first and the second side plate portions 71, 72 and is provided with a hole that accommodates the outer rotor 51 and the inner rotor 52. The rotor chamber 50a is formed by the first side plate portion 71, the second side plate portion 72, and the center plate portion 73.

Center holes 71a, 72a that are continuous with the rotor chamber 50a are formed in center portions of the first and the second side plate portions 71, 72, respectively, and a drive shaft 54 that is disposed in the inner rotor 52 is fitted into the center holes 71a, 72a. The outer rotor 51 and the inner rotor 52 are disposed such that they can rotate freely within the hole in the center plate portion 73. In other words, a rotating portion that is configured from the outer rotor 51 and the inner rotor 52 is mounted within the rotor chamber 50a of the casing 50 such that it can rotate freely, with the outer rotor 51 rotating about the point X as its axis and the inner rotor 52 rotating about the point Y as its axis.

A center line Z of the rotary pump 10 is defined as a line that passes through the point X and the point Y that respectively serve as the rotational axes of the outer rotor 51 and the inner rotor 52. A suction port 60 and a discharge port 61 that are continuous with the rotor chamber 50a are formed in the first side plate portion 71 to the left and the right, respectively, of the center line Z. The suction port 60 and the discharge port 61 are disposed in positions that are continuous with the plurality of chamber portions 53. The brake fluid can be taken into the plurality of chamber portions 53 from the outside through the suction port 60, and the brake fluid within the plurality of chamber portions 53 can be discharged to the outside through the discharge port 61.

Within the plurality of chamber portions 53, a closed portion 53a on the side that has the maximum volume and a closed portion 53b on the side that has the minimum volume are not continuous with either the suction port 60 or the discharge port 61, and a differential pressure between an intake pressure of the suction port 60 and a discharge pressure of the discharge port 61 is maintained by the closed portions 53a, 53b.

In a wall surface of the center plate portion 73 that forms the hole in the center plate portion 73, on the suction port 60 side of the center line Z, a recessed portion 73a and a recessed portion 73b are formed at positions that are at approximately forty-five-degree angles from the center line Z, with the point X that is the rotational axis of the outer rotor 51 serving as the vertex of the angles. Seal members 80, 81 are respectively provided in the recessed portions 73a, 73b to inhibit the flow of the brake fluid around the outer circumference of the outer rotor 51. The seal members 80, 81 provide sealing such that the brake fluid pressure around the outer circumference of the outer rotor 51 is divided into a low pressure portion and a high pressure portion.

The seal member 80 is configured from a rubber member 80a that is one of spherical and roughly cylindrical in shape and a resin member 80b that is rectangular in shape. One of PTFE, carbon fiber-bearing PTFE, and graphite-bearing PTFE is used for the resin member 80b. The resin member 80b is pressed by the rubber member 80a such that the resin member 80b comes into contact with outer rotor 51. That is, the elastic force of the rubber member 80a can compensate for small errors in the size of the outer rotor 51 that occur due to manufacturing errors and the like.

The width of the resin member 80b (the width in the rotational direction of the outer rotor 51) is such that, when the resin member 80b is disposed within the recessed portion 73a, a small gap exists between the resin member 80b and the wall of the recessed portion 73a. In other words, if the width of the resin member 80b were formed to be the same as the width of the recessed portion 73a, it would be difficult for the resin member 80b to protrude from the recessed portion 73a when it is pressed into the recessed portion 73a by the flow of the brake fluid while the rotary pump 10 is being driven. Forming the resin member 80b at a size that leaves a small gap makes it possible for the brake fluid to reach the rubber member 80a side of the resin member 80b, such that the pressure of the brake fluid makes it easier for the resin member 80b to protrude from the recessed portion 73a. Note that the seal member 81 is also configured such that it is provided with a rubber member 81a and a resin member 81b, but the structure of the seal member 81 is the same as that of the seal member 80, so an explanation of it will be omitted.

As shown in FIG. 2B, seal groove portions 71b, 72b are formed in the first and the second side plate portions 71, 72. As shown by dotted lines in FIG. 2A, the seal groove portions 71b, 72b are configured into ring shapes (rim shapes) that surround the drive shaft 54 and are also configured such that the groove widths increase in specified areas. Further, the centers of the seal groove portions 71b, 72b are in a state in which they are offset toward the suction port 60 side (the left side in FIG. 2A) in relation to the axial center of the drive shaft 54.

The seal groove portions 71b, 72b thus pass between the discharge port 61 and the drive shaft 54, while the closed portions 53a, 53b are disposed such that they pass through portions where the seal members 80, 81 seal the outer rotor 51.

Seal members 100, 101 are disposed within the seal groove portions 71b, 72b that are configured in this manner. The seal members 100, 101 are respectively configured from elastic members 100a, 101a that are made from an elastic material such as rubber or the like and resin members 100b, 101b that are made from resin. The elastic members 100a, 101a press the resin members 100b, 101b toward the outer rotor 51 and the inner rotor 52.

Figure 3A:
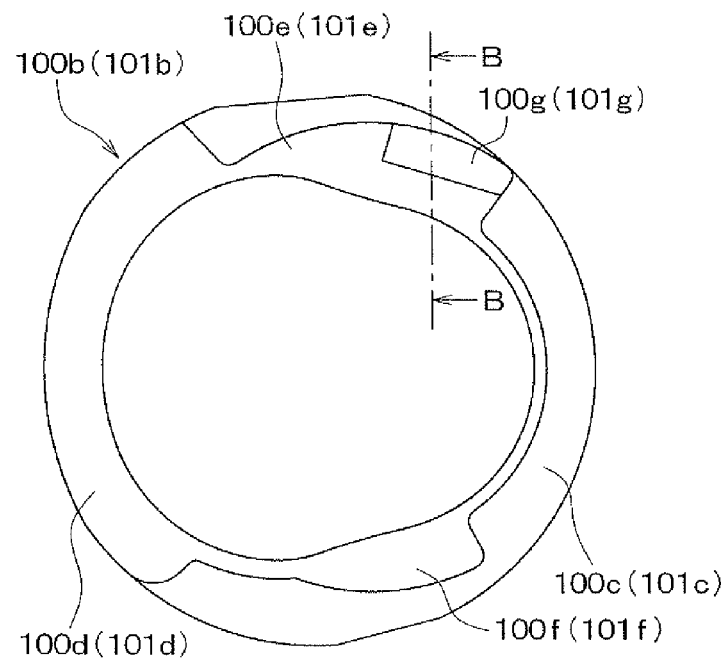
FIG. 3A is an enlarged front view of a resin member of a seal member.
Figure 3B:
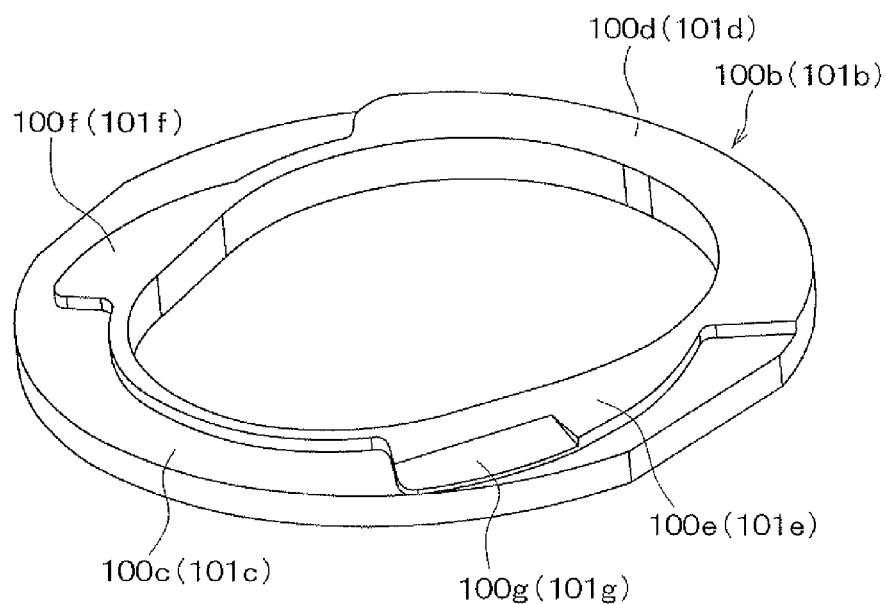
FIG. 3B is an enlarged oblique view of the resin member.
Figure 3C:
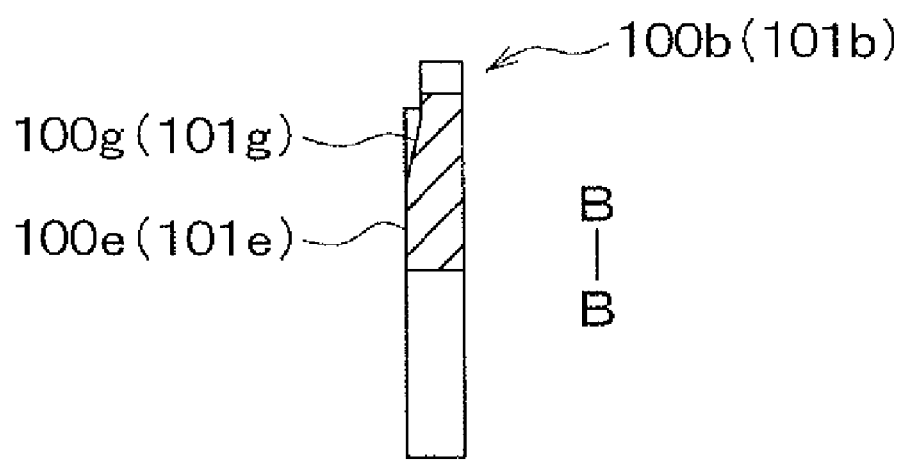
FIG. 3C is an enlarged sectional view of the resin member along a line B-B in FIG. 3A.

FIG. 3A is an enlarged front view of the resin member 100b of the seal member 100, FIG. 3B is an enlarged oblique view of the resin member 100b, and FIG. 3C is an enlarged sectional view of the resin member 100b along a line B-B in FIG. 3A. Hereinafter, the structure of the resin members 100b, 101b will be explained in detail using FIGS. 3A to 3C, but the resin members 100b, 101b are mirror images of one another that symmetrically sandwich the outer rotor 51 and the inner rotor 52 between them, and their structures are basically the same, so the explanation will use the resin member 100b as an example.

As shown in FIGS. 3A and 3B, the resin member 100b is ring-shaped, forming the same sort of shape as that of the seal groove portion 71b. In addition, the resin member 100b is a stepped plate, on one end face of which a recessed portion 100c and a raised portion 100d are formed.

The resin member 100b is disposed such that the side on which the raised portion 100d is formed faces the open side of the seal groove portion 71b, such that the raised portion 100d comes into contact with one end face of each of the outer and the inner rotors 51, 52 and the center plate portion 73. The elastic member 100a is disposed closer to the bottom of the seal groove portion 71b than is the resin member 100b, so the elastic force of the elastic member 100a and the discharge pressure of the brake fluid that is introduced into the seal groove portion 71b (hereinafter collectively called a pressing pressure) presses upon the resin member 100b such that it performs a sealing function.

The raised portion 100d includes a sealing portion 100e and a sealing portion 100f. The sealing portion 100e and the sealing portion 100f are configured such that their widths at least cover the closed portions 53a, 53b, respectively, and they play a role of relieving the brake fluid such that the internal pressure in the closed portion 53a will not become too high, even as they seal the closed portions 53a, 53b.

An inclined portion 100g that is partially inclined is formed in the sealing portion 100e that covers the closed portion 53a, which is on the side that has the maximum volume within the plurality of chamber portions 53. In the area where the inclined portion 100g is formed, the sealing portion 100e has a thin-walled portion that is thinner than other portions. In the present embodiment, the inclined portion 100g is structured such that it is inclined toward the outer side of the resin member 100b in the radial direction, in a location within the sealing portion 100e that is closer to the discharge port 61 than is a location that covers the suction port 60.

With regard to the resin member 101b of the seal member 101, note that it and the resin member 100b are mirror images of one another that symmetrically sandwich the outer rotor 51 and the inner rotor 52 between them. FIG. 3A shows the resin member 100b, and the shape of the resin member 101b is the mirror image of the resin member 100b, and in the same manner that the portions 100c to 100g are provided in the resin member 100b, as shown in FIG. 3A, portions 101c to 101g are provided in the resin member 101b.

In the gaps between the axial direction end faces of the inner rotor 52 and the outer rotor 51 and the first and the second side plate portions 71, 72, the seal members 100, 101 that are thus disposed seal off the high pressure discharge port 61 from the gap between the low pressure drive shaft 54 and the inner rotor 52, and from the suction port 60.

Further, in order to seal the high pressure portion and the low pressure portion in the gaps between the axial direction end faces of the inner rotor 52 and the outer rotor 51 and the first and the second side plate portions 71, 72, it is necessary for the seal members 100, 101 to extend through the interval between the discharge port 61 and the drive shaft 54 and through the interval between the discharge port 61 and the suction port 60, such that they extend to the periphery of the outer rotor 51.

In contrast to this, in the present embodiment, the areas of the seal members 100, 101 from the seal member 80, extending through the intervals between the drive shaft 54 and the discharge port 61, and reaching the seal member 81, are the areas where it is necessary to seal off the high pressure portion from the low pressure portion, and in the other areas, where sealing is not required, the portions that come into contact with the inner rotor 52 and the outer rotor 51 are so few that they can be ignored. It is therefore possible to reduce the contact resistance by the seal members 100, 101 and to reduce mechanical loss.

Next the operations of the brake device and the rotary pump 10 that are thus configured will be explained.

In a case where it is desired to generate a large braking force by generating a wheel cylinder pressure that is greater than the master cylinder pressure that is generated by the operation of the brake pedal 1 by the driver, such as in a case where a braking force that corresponds to the brake pedal force cannot be produced, for example, or in a case where the amount of operation of the brake pedal 1 is large, the two-position valve 23 that is provided in the brake device is put into a suitably open state, and the linear differential pressure control valve 22 is put into the differential pressure state.

On the other hand, in the rotary pump 10, the inner rotor 52 rotates in response to the rotation of the drive shaft 54 by the drive of the motor 11, and in conjunction with that, the outer rotor 51 is rotated in the same direction by the meshing of the internal tooth portion 51a and the external tooth portion 52a. At this time, the volumes of the various chambers 53 vary to a greater or lesser extent with each revolution of the outer rotor 51 and the inner rotor 52, so the brake fluid is sucked from the suction port 60 and the brake fluid is discharged from the discharge port 61 toward the hydraulic conduit A2. The wheel cylinder pressure is increased by the discharged brake fluid. In other words, by rotating the outer and the inner rotors 51, 52, the rotary pump 10 performs the basic pump operations of suction the brake fluid from the suction port 60 and discharging the brake fluid from the discharge port 61.

The rotary pump 10 then enters a state in which the differential pressure is generated by the linear differential pressure control valve 22, so the discharge pressure of the rotary pump 10 acts on the downstream side of the linear differential pressure control valve 22, that is, on the individual wheel cylinders 4, 5, and the wheel cylinder pressures that are greater than the master cylinder pressure are generated. In this manner, the brake device can generate a wheel cylinder pressure that is higher than the master cylinder pressure that is generated by the operation of the brake pedal 1 by the driver.

In the operation of the rotary pump 10 at this time, the portion of the outer rotor 51 on the suction port 60 side is subject to intake pressure by the brake fluid that is taken in through the pressure regulation reservoir 40, and the portion of the outer rotor 51 on the discharge port 61 side is subject to discharge pressure by the brake fluid that is discharged under high pressure.

Therefore, the low pressure portion and the high pressure portion are generated on the outer circumference of the outer rotor 51. However, as described previously, the seal members 80, 81 provide sealing that keeps the low pressure portion and the high pressure portion on the outer circumference of the outer rotor 51 separate from one another, so brake fluid leakage from the high pressure portion on the discharge port 61 side to the low pressure portion on the suction port 60 side does not occur around the outer circumference of the outer rotor 51. Further, the seal members 80, 81 cause the suction port 60 side of the outer circumference of the outer rotor 51 to have a low pressure that is the same as the pressure in the chambers 53 that are continuous with the suction port 60 and cause the discharge port 61 side of the outer circumference of the outer rotor 51 to have a high pressure that is the same as the pressure in the chambers 53 that are continuous with the discharge port 61. A pressure balance is therefore maintained between the inner and the outer sides of the outer rotor 51, making it possible for the rotary pump 10 to be driven in a stable manner.

Moreover, in the rotary pump 10 according to the present embodiment, because the seal members 80, 81 are positioned on the suction port 60 side, the area of the high discharge pressure extends to positions on the outer circumference of the outer rotor 51 that surround the closed portions 53a, 53b. This causes the outer rotor 51 to be pressed from the directions that are shown in FIG. 2A as above and below, such that a load is applied in the closed portion 53a in a direction that reduces the gaps between the tooth tips of the internal tooth portion 51a of the outer rotor 51 and the external tooth portion 52a of the inner rotor 52, thus acting to reduce the gaps between the tooth tips of the internal tooth portion 51a and the external tooth portion 52a. This makes it possible to inhibit the brake fluid from leaking through the gaps between the tooth tips of the internal tooth portion 51a of the outer rotor 51 and the external tooth portion 52a of the inner rotor 52.

In contrast, in the gaps between the axial direction end faces of the inner rotor 52 and the outer rotor 51 and the first and the second side plate portions 71, 72, the low pressure portion is formed by the suction port 60 and the gap between the low pressure drive shaft 54 and the inner rotor 52, while the high pressure portion is formed by the high pressure discharge port 61. However, because the low pressure portion and the high pressure portion in the gaps between the axial direction end faces of the inner rotor 52 and the outer rotor 51 and the first and the second side plate portions 71, 72 are scaled off from one another by the seal members 100, 101, leakage of the brake fluid from the high pressure portion to the low pressure portion does of the occur. Moreover, because the seal members 100, 101 are formed such that they extend over the seal members 80, 81, there are no gaps between the seal members 100, 101 and the seal members 80, 81, so leakage of the brake fluid also does not occur between the seal members 100, 101 and the seal members 80, 81.

Figure 4A:
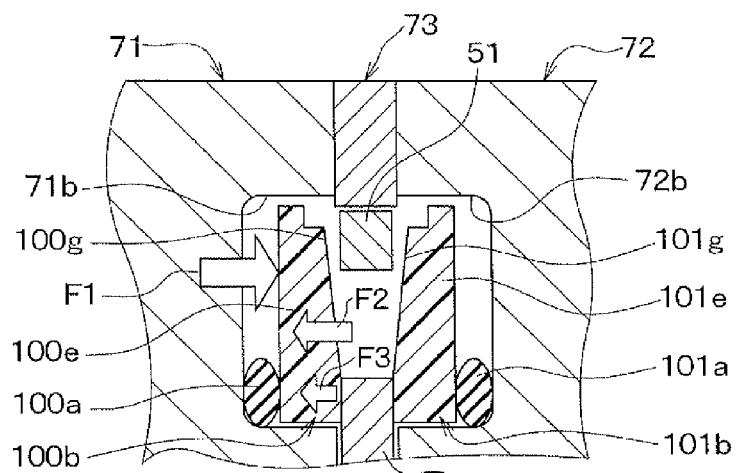
FIG. 4A is a schematic sectional view along a line C-C in FIG. 2A that shows relationships among forces that act on individual locations in resin members.
Figure 4B:
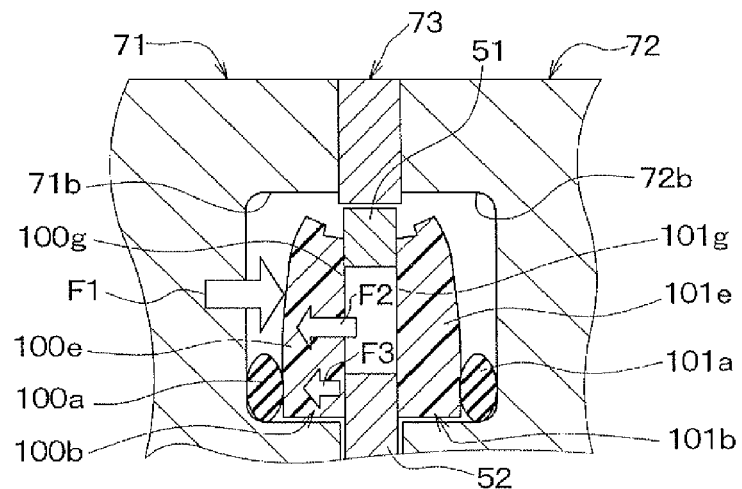
FIG. 4B is a schematic sectional view along the line C-C in FIG. 2A that shows relationships among forces that act on individual locations in the resin members.
Figure 4C:
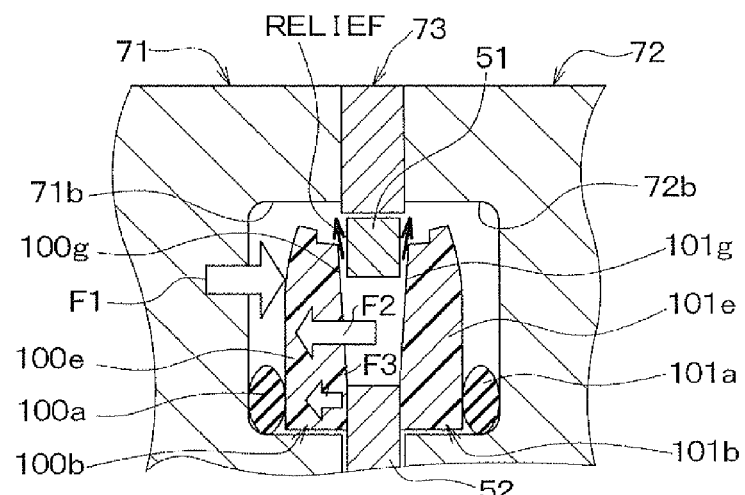
FIG. 4C is a schematic sectional view along the line C-C in FIG. 2A that shows relationships among forces that act on individual locations in the resin members.

However, in the present embodiment, in the resin members 100b, 101b of the seal members 100, 101, the inclined portions 100g, 101g are provided in the sealing portions 100e, 101e that cover the closed portion 53a. This prevents the brake fluid from leaking from the high pressure portion to the low pressure portion as described above and also prevents the brake fluid pressure from increasing excessively within the closed portion 53a. This mechanism will be explained with reference to FIGS. 4A to 4C. FIGS. 4A to 4C are schematic sectional views along a line C-C in FIG. 2A that show relationships among forces that act on individual locations in the resin members 100b, 101b.

First, as shown in FIG. 4A, a pressing force F1, a pushback force F2, and a pushback force F3 act on the resin members 100b, 101b. The pressing force F1 combines the elastic force of the elastic member 100a and the discharge pressure of the brake fluid that is introduced into the seal groove portion 71b. The pushback force F2 is based on the brake fluid pressure within the closed portion 53a. The pushback force F3 is due to the brake fluid pressure on the contact surfaces of the outer and the inner rotors 51, 52. A combined force F that acts on the resin members 100b, 101b is expressed by the equation below.

Combined force *F*=Pressing force *F*1−Pushback force *F*2−Pushback force *F*3   Equation 1

Ordinarily, the combined force F is designed to be greater than necessary, such that the closed portion 53a can be reliably sealed by the resin members 100b, 101b, so the surface pressures are high when the sealing portions 100e, 101e press against the end faces of the outer rotor 51 and the inner rotor 52. However, in the present embodiment, the inclined portions 100g, 101g are formed in the sealing portions 100e, 101e, making it possible to reduce the initial surface pressure that is applied when the sealing portions 100e, 101e come into contact with the outer rotor 51 and the inner rotor 52. In other words, surface pressures are generated on the inclined portions 100g, 101g when the pressing force F1 acts on the sealing portions 100e, 101e, flexing them and bringing them into contact with the outer rotor 51 and the inner rotor 52. This makes it possible to reduce the initial surface pressure from its level in the known structure in which the inclined portions 100g, 101g are not formed, to the extent that the inclined portions 100g, 101g must be flexed.

As shown in FIG. 4B, when the internal pressure in the closed portion 53a is an appropriate pressure, the inclined portions 100g, 101g can be kept in contact with the outer rotor 51 and the inner rotor 52 by the pressing force F1, even if the part of the pressing force F1 that flexes the inclined portions 100g, 101g is withdrawn. The closed portion 53a can therefore be sealed by the sealing portions 100e, 101e.

In contrast, if the brake fluid pressure within the closed portion 53a increases to the point that the brake fluid is excessively compressed, as shown in FIG. 4C, the pushback force F2 increases. At this time, the surface pressures when the sealing portions 100e, 101e press against the end faces of the outer rotor 51 and the inner rotor 52 are lower than in the known structure, so the inclined portions 100g, 101g are separated from the outer rotor 51 and the inner rotor 52 by the internal pressure in the closed portion 53a, and the brake fluid within the closed portion 53a is released to the outside. It is therefore possible to prevent the brake fluid within the closed portion 53a from increasing excessively.

In this manner, it is possible to prevent the brake fluid from leaking from the high pressure portion to the low pressure portion as described above, as well as to prevent the brake fluid pressure from increasing excessively within the closed portion 53a.

As explained above, in the rotary pump 10 according to the present embodiment, it is possible to prevent the brake fluid from leaking from the high pressure portion to the low pressure portion as described above, as well as to prevent the brake fluid pressure from increasing excessively within the closed portion 53a. Because the brake fluid pressure within the closed portion 53a does not become too high, it is also possible to prevent a discharge pulsation from increasing when the brake fluid is discharged from the discharge port 61, which would create a problem of increased noise, so the rotary pump 10 is made quieter. In addition, it is possible to prevent the internal pressure in the closed portion 53a from pushing open the locations where the tooth tips of the internal tooth portion 51a of the outer rotor 52 and the external tooth portion 52a of the inner rotor 52 come into contact, thus making it possible to prevent the brake fluid from leaking around the tooth tips from the high pressure portion to the low pressure portion.

Note that because the inclined portions 100g, 101g are not provided on the inner edges of the resin members 100b, 101b, the contact between the resin members 100b, 101b and the outer rotor 51 and the inner rotor 52 is maintained in those areas. Therefore, the surface pressure in those areas is maintained at the same level as in the known structure, so leaking of the brake fluid through the spaces between the resin members 100b, 101b and the outer rotor 51 and the inner rotor 52 from the high pressure portion to the low pressure portion can be reliably prevented.

Second Embodiment

A second embodiment of the present invention will be explained. In the brake device in the present embodiment, the structure of the resin members 100b, 101b of the seal members 100, 101 in the rotary pump 10 is different from the structure in the first embodiment. In all other respects, the second embodiment is the same as the first embodiment, so only the portions that differ will be explained.

Figure 5A:
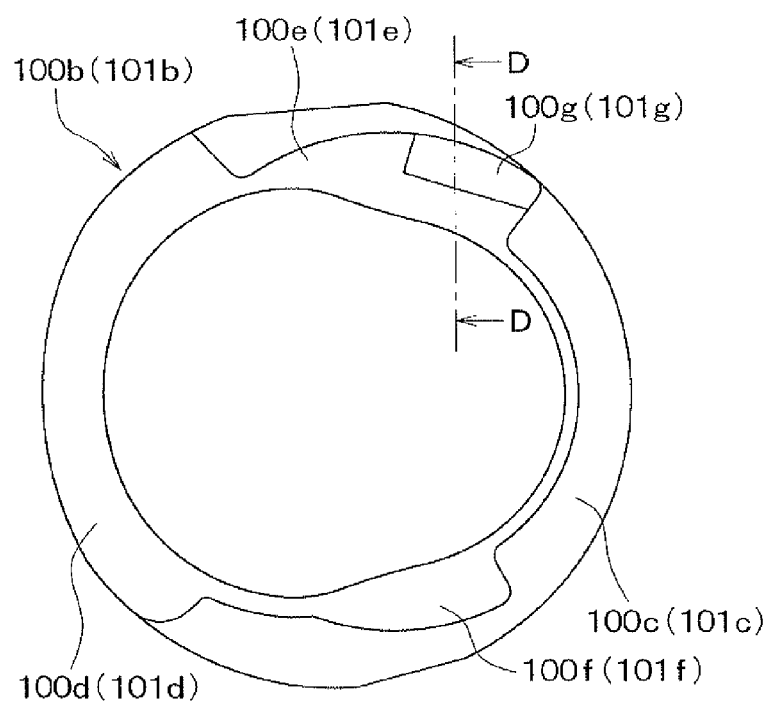
FIG. 5A is an enlarged front view of the resin member in the seal member that is provided in the rotary pump according to a second embodiment of the present invention.
Figure 5B:
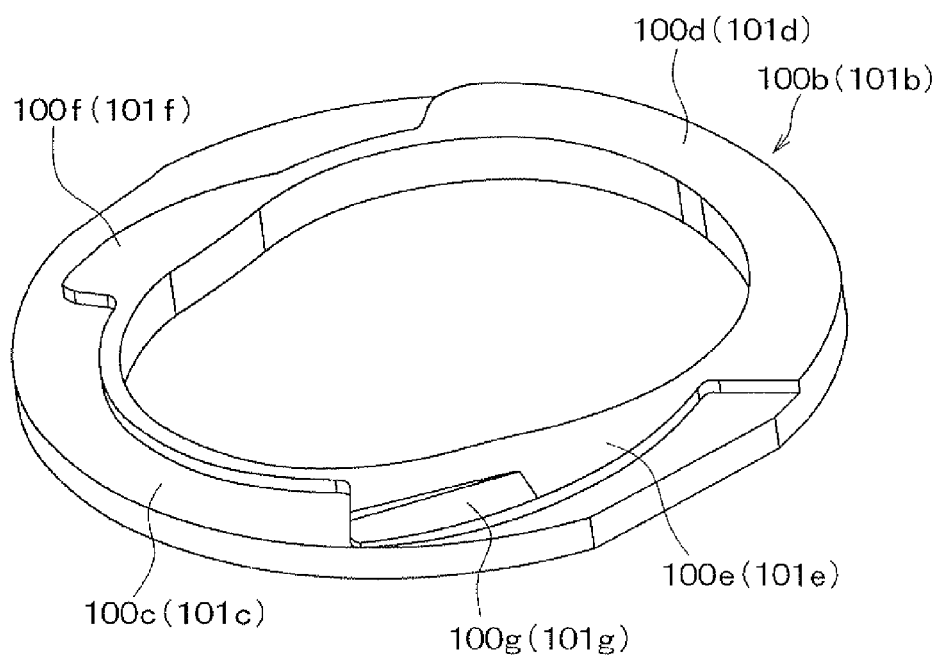
FIG. 5B is an enlarged oblique view of the resin member according to a second embodiment of the present invention.
Figure 5C:
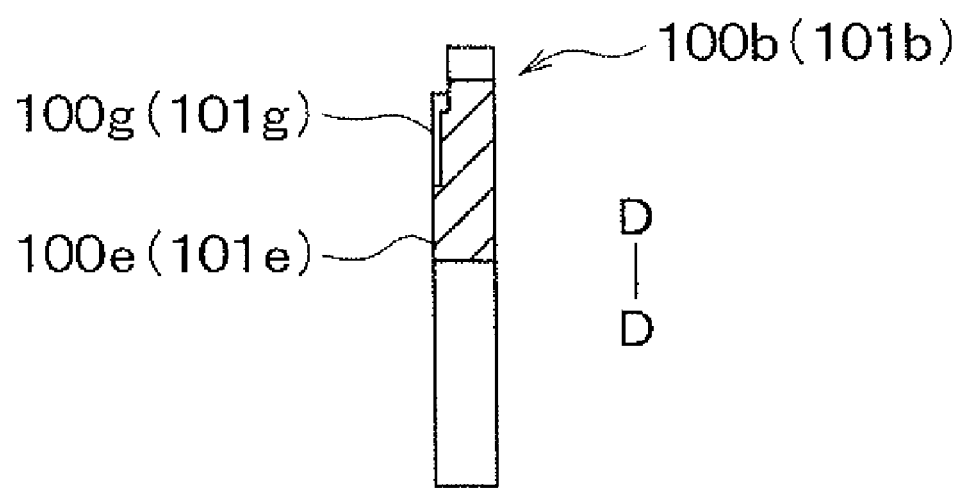
FIG. 5C is an enlarged sectional view of the resin member according to a second embodiment of the present invention along a line D-D in FIG. 5A.

FIG. 5A is an enlarged front view of the resin member 100b in the seal member 100. FIG. 5B is an enlarged oblique view of the resin member 100b. FIG. 5C is an enlarged sectional view of the resin member 100b along a line D-D in FIG. 5A. Hereinafter, the structure of the resin members 100b, 101b according to the present embodiment will be explained in detail using FIGS. 5A to 5C. Note that in the present embodiment as well, the resin members 100b, 101b are mirror images of one another that symmetrically sandwich the outer rotor 51 and the inner rotor 52 between them.

As shown in FIG. 5A, the inclined portions 100g, 101g are provided in the resin members 100b, 101b, but in the present embodiment, as shown in FIGS. 5B and 5C, the inclined portions 100g, 101g are structured such that they are inclined along the circumferences of the resin members 100b, 101b, toward the discharge port 61 side specifically, in locations within the sealing portions 100e, 101e that are closer to the discharge port 61 than are the locations that cover the suction port 60.

This makes it possible to achieve the same effects as those of the first embodiment, even though the direction in which the inclined portions 100g, 101g are inclined is different from the direction in the first embodiment.

Third Embodiment

A third embodiment of the present invention will be explained with reference to FIGS. 6A and 6B. In the brake device in the present embodiment, the structure of the resin members 100b, 101b of the seal members 100, 101 in the rotary pump 10 is different from the structure in the first embodiment. In all other respects, the second embodiment is the same as the first embodiment, so only the portions that differ will be explained.

Figure 6A:
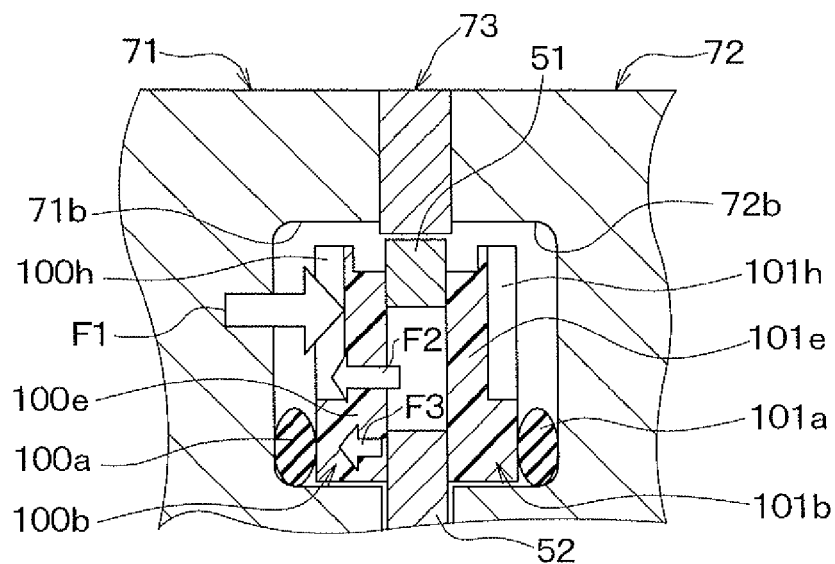
FIG. 6A is a schematic sectional view that shows relationships among forces that act on individual locations of resin members of the rotary pump according to a third embodiment of the present invention.
Figure 6B:
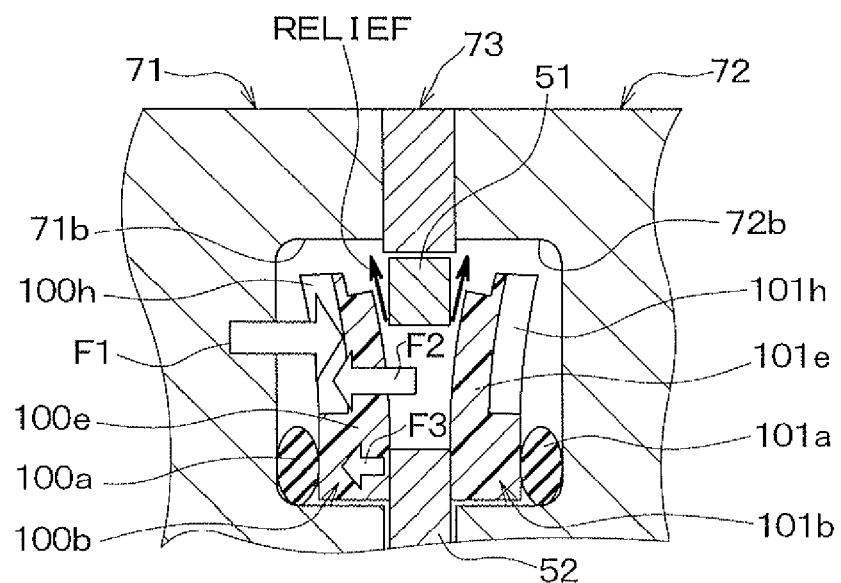
FIG. 6B is a schematic sectional view that shows relationships among forces that act on individual locations of the resin members of the rotary pump according to the third embodiment of the present invention.

FIGS. 6A and 6B are schematic sectional views that show relationships among forces that act on individual locations of the resin members 100b, 101b. The cross sections correspond to the cross section along the line C-C in FIG. 2A.

As shown in FIGS. 6A and 6B, in the rotary pump 10 according to the present embodiment, counterbore portions (groove portions) 100h, 101h that reduce the thicknesses of the sealing portions 100e, 101e are provided in the sealing portions 100e, 101e on the opposite sides (rear face sides) from the end faces that face the outer rotor 51 and the inner rotor 52. In the areas where the counterbore portions 100h, 101h are formed, the sealing portions 100e, 101e have thin-walled portions that are thinner than other portions. Specifically, the counterbore portions 100h, 101h are formed in areas that include portions of the sealing portions 100e, 101e that correspond to the closed portion 53a. It is therefore possible to make the rigidity of the sealing portions 100e, 101e less than that of the known structure in which the counterbore portions 100h, 101h are not formed.

As shown in FIG. 6A, when the internal pressure in the closed portion 53a is an appropriate pressure, the inclined portions 100g, 101g can be kept in contact with the outer rotor 51 and the inner rotor 52 by the pressing force F1. The closed portion 53a can therefore be sealed by the sealing portions 100e, 101e.

In contrast, if the brake fluid pressure within the closed portion 53a increases to the point that the brake fluid is excessively compressed, as shown in FIG. 6B, the internal pressure in the closed portion 53a, that is, the pushback force F2, increases. Furthermore, because the rigidity of the sealing portions 100e, 101e has been reduced by the forming of the counterbore portions 100h, 101h, the sealing portions 101e, 101e are flexed by the internal pressure in the closed portion 53a, such that the sealing portions 100e, 101e can be separated from the outer rotor 51 and the inner rotor 52, and the brake fluid within the closed portion 53a is released to the outside. It is therefore possible to prevent the brake fluid within the closed portion 53a from increasing excessively.

In this manner, it is possible to prevent the brake fluid from leaking from the high pressure portion to the low pressure portion as described above, as well as to prevent the brake fluid pressure from increasing excessively within the closed portion 53a. It is therefore possible for the present embodiment to achieve the same effects as those of the first embodiment.

Other Embodiments

In the first to the third embodiments that are described above, the forming of the inclined portions 100g, 101g and the counterbore portions 100h, 101h causes portions of the sealing portions 100e, 101e to function as thin-walled portions that are thinner than other portions of the raised portions 100d, 101d of the resin members 100b, 101b. However, the specific structures that are shown in the first to the third embodiments are simply examples, and other structures may also be used.

For example, in the first and the second embodiments, the inclined portions 100g, 101g are structured such that they are inclined toward the outer side of the resin members 100b, 101b in the radial direction and inclined toward the discharge port 61, but as long as they are inclined toward the high pressure portion, they may be inclined in any direction.

In the third embodiment, the shape of the counterbore portions 100h, 101h, instead of being a shape with a rectangular cross section like that shown in FIG. 6A, may, for example, be a shape with a triangular cross section, that is, a tapered cross section, and may also be a shape with a rectangular cross section with rounded corners.

With regard to the positions of the counterbore portions 100h, 101h, the counterbore portions 100h, 101h may be formed in anywhere on the rear faces of the sealing portions 100e, 101e, provided that at least the portions that make contact with the elastic members 100a, 101a are left and that the sealing portions 100e, 101e are made flexible by reducing their rigidity. That is, the counterbore portions 100h, 101h may be formed in any position that corresponds to at least the outer portion of the closed portion 53a in the radial direction.

In the embodiments that are described above, the seal members 100, 101 are configured in ring shapes, but other shapes may also be used. That is, the seal members 100, 101 may have any sort of shape, as long as they extend through the interval between the discharge port 61 and the drive shaft 54 and over the closed portions 53a, 53b, such that they reach the periphery of the outer rotor 51. However, it is possible to reduce contact resistance by reducing the areas that are covered by the seal members 100, 101 where sealing is not required, such as the discharge port 61, the suction port 60, the portions of the outer circumference of the outer rotor 51 where the same pressure as the discharge port 61 and the suction port 60 is desired, and the like, for example. Further, making the seal members 100, 101 ring-shaped makes it possible to provide the sealing all the way around the central axis of rotation of the outer rotor 51 and the inner rotor 52. This in turn makes it possible for a thin-walled portion to be provided on one side of the seal members 100, 101 in the radial direction and for the displaceable thin-walled portion to be formed easily.

Furthermore, both the inclined portions 100g, 101g that are described in the first and the second embodiments and the counterbore portions 100h, 101h that are described in the third embodiment may be formed in the resin members 100b, 101b.

Each of the embodiments that are described above has been explained using the trochoid pump as an example of an internal gear pump, but the present invention is not limited to this example and may also be applied to an internal gear pump with a different structure. Each of the embodiments that are described above has also been explained using the rotary pump 10, which has a structure in which the suction port 60 is disposed on the inner circumference side of the seal members 100, 101 and the discharge port 61 is disposed on the outer circumference side of the seal members 100, 101, but a structure may also be used in which the suction port 60 is disposed on the outer circumference side of the seal members 100, 101 and the discharge port 61 is disposed on the inner circumference side of the seal members 100, 101.

While the above description is of the preferred embodiments of the present invention, it should be appreciated that the invention may be modified, altered, or varied without deviating from the scope and fair meaning of the following claims.

What is claimed is:

1. A rotary pump, comprising:
a rotating portion that includes an outer rotor having an internal tooth portion on its inner circumference and an inner rotor having an external tooth portion and rotates about a drive shaft as its axis, the rotating portion being assembled such that a plurality of chamber portions is formed by a meshing of the internal tooth portion and the external tooth portion; and
a casing that covers the rotating portion and includes opening portions into which the drive shaft is fitted, a suction port that takes a fluid into the rotating portion, and a discharge port that discharges the fluid from the rotating portion,
wherein the rotary pump is configured such that a pressure difference between the suction port and the discharge port is maintained by a closed portion that has the greatest volume among the plurality of chamber portions, and a rotating movement of the rotating portion causes the fluid to be sucked from the suction port and the fluid to be discharged through the discharge port,
a seal element that is disposed within a seal groove portion that is formed in a surface of the casing that faces axial direction end faces of the inner rotor and the outer rotor, the seal element being disposed in a gap between the casing and the axial direction end faces of the inner rotor and the outer rotor, extending through a gap between the discharge port and the drive shaft, extending through the closed portion, and reaching the periphery of the outer rotor, the seal element including a sealing portion that covers the closed portion, and
a thin-walled portion is provided in the sealing portion of the seal element, making the axial direction thickness of the sealing portion thinner in the area that come into contact with the axial direction end face of the outer rotor than in the area that come into contact with the axial direction end face of the inner rotor, such that the area on the outer rotor side of the sealing portion separates from the outer rotor as an internal pressure of the close portion increases,
wherein the thin-wall portion is an inclined portion that is formed in the sealing portion in a position that faces to the axial direction end faces of the inner rotor and the outer rotor.

2. The rotary pump according to claim 1, wherein the inclined portion is inclined such that the thicknesses of the sealing portion become thinner toward either an outer side of the sealing portion in the radial direction or the discharge port side along outer circumference of the sealing portion, with the drive shaft serving as a center.

3. The rotary pump according to claim 1,
wherein the seal groove portion and the seal element are formed into ring shapes and are disposed eccentrically in relation to the drive shaft, one of the suction port and the discharge port is disposed on the inner circumference side of the seal element, and the other of the suction port and the discharge port is disposed on the outer circumference side of the seal element.

4. A brake device in which is provided the rotary pump according to claim 1, comprising:
brake fluid pressure generating elements that generate a brake fluid pressure based on a pedal force;
braking force generation elements that generate braking forces on wheels based on the brake fluid pressure;
a main hydraulic conduit that is connected to the brake fluid pressure generating elements and transmits the brake fluid pressure to the braking force generation elements; and
an auxiliary hydraulic conduit that is connected to the brake fluid pressure generating elements and supplies the brake fluid to the main hydraulic conduit in order to increase the braking forces that the braking force generation elements generate,
wherein the rotary pump is disposed such that the suction port can take in the brake fluid on the brake fluid pressure generating elements side through the auxiliary hydraulic conduit and the discharge port can discharge the brake fluid toward the braking force generation elements through the main hydraulic conduit.

5. A rotary pump, comprising:
a rotating portion that includes an outer rotor having an internal tooth portion on its inner circumference and an inner rotor having an external tooth portion and rotates about a drive shaft as its axis, the rotating portion being assembled such that a plurality of chamber portions is formed by a meshing of the internal tooth portion and the external tooth portion; and
a casing that covers the rotating portion and includes opening portions into which the drive shaft is fitted, a suction port that takes a fluid into the rotating portion, and a discharge port that discharges the fluid from the rotating portion,
wherein the rotary pump is configured such that a pressure difference between the suction port and the discharge port is maintained by a closed portion that has the greatest volume among the plurality of chamber portions, and a rotating movement of the rotating portion causes the fluid to be sucked from the suction port and the fluid to be discharged through the discharge port,
a seal element that is disposed within a seal groove portion that is formed in a surface of the casing that faces axial direction end faces of the inner rotor and the outer rotor, the seal element being disposed in a gap between the casing and the axial direction end faces of the inner rotor and the outer rotor, extending through a gap between the discharge port and the drive shaft, extending through the closed portion, and reaching the periphery of the outer rotor, the seal element including a sealing portion that covers the closed portion, and
a thin-walled portion is provided in the sealing portion of the seal element, making the axial direction thickness of the sealing portion thinner in the area that come into contact with the axial direction end face of the outer rotor than in the area that come into contact with the axial direction end face of the inner rotor, such that the area on the outer rotor side of the sealing portion separates from the outer rotor as an internal pressure of the close portion increases,
wherein the thin-walled portion is configured by forming a counterbore portion in a rear side of the sealing portion that is on the opposite side from the side that faces the axial direction end faces of the inner rotor and the outer rotor.

6. The rotary pump according to claim 5,
wherein the seal groove portion and the seal element are formed into ring shapes and are disposed eccentrically in relation to the drive shaft, one of the suction port and the discharge port is disposed on the inner circumference side of the seal element, and the other of the suction port and the discharge port is disposed on the outer circumference side of the seal element.

7. A brake device in which is provided the rotary pump according to claim 5, comprising:
   - brake fluid pressure generating elements that generate a brake fluid pressure based on a pedal force braking force generation elements that generate braking forces on wheels based on the brake fluid pressure;
   - a main hydraulic conduit that is connected to the brake fluid pressure generating elements and transmits the brake fluid pressure to the braking force generation elements; and
   - an auxiliary hydraulic conduit that is connected to the brake fluid pressure generating elements and supplies the brake fluid to the main hydraulic conduit in order to increase the braking forces that the braking force generation generate,
   - wherein the rotary pump is disposed such that the suction port can take in the brake fluid on the brake fluid pressure generating elements side through the auxiliary hydraulic conduit and the discharge port can discharge the brake fluid toward the braking force generation elements through the main hydraulic conduit.

8. A rotary pump, comprising:
   - a rotating portion that includes an outer rotor having an internal tooth portion on its inner circumference and an inner rotor having an external tooth portion and rotates about a drive shaft as its axis, the rotating portion being assembled such that a plurality of chamber portions is formed by a meshing of the internal tooth portion and the external tooth portion; and
   - a casing that covers the rotating portion and includes opening portions into which the drive shaft is fitted, a suction port that takes a fluid into the rotating portion, and a discharge port that discharges the fluid from the rotating portion,
   - wherein the rotary pump is configured such that a pressure difference between the suction port and the discharge port is maintained by a closed portion that has the greatest volume among the plurality of chamber portions, and a rotating movement of the rotating portion causes the fluid to be sucked from the suction port and the fluid to be discharged through the discharge port,
   - a seal element that is disposed within a seal groove portion that is formed in a surface of the casing that faces axial direction end faces of the inner rotor and the outer rotor, the seal element being disposed in a gap between the casing and the axial direction end faces of the inner rotor and the outer rotor, extending through a gap between the discharge port and the drive shaft, extending through the closed portion, and reaching the periphery of the outer rotor, the seal element including a sealing portion that covers the closed portion, and
   - a inclined portion is provided at a position in the sealing portion of the seal element that faces the axial direction end faces of the inner rotor and the outer rotor,
   - wherein the inclined portion is inclined where a distance between the sealing portion of the seal element and the axial direction end faces of the inner rotor and the outer rotor becomes larger toward either an outer side of the sealing portion in the radial direction or the discharge port side along outer circumference of the sealing portion, with the drive shaft serving as a center, such that the area on the outer rotor side of the sealing portion separates from the outer rotor as an internal pressure of the closed portion increases.

9. The rotary pump according to claim 8,
   - wherein the seal groove portion and the seal element are formed into ring shapes and are disposed eccentrically in relation to the drive shaft, one of the suction port and the discharge port is disposed on the inner circumference side of the seal element, and the other of the suction port and the discharge port is disposed on the outer circumference side of the seal element.

10. A brake device in which is provided the rotary pump according to claim 8, comprising:
   - brake fluid pressure generating elements that generate a brake fluid pressure based on a pedal force;
   - braking force generation elements that generate braking forces on wheels based on the brake fluid pressure;
   - a main hydraulic conduit that is connected to the brake fluid pressure generating elements and transmits the brake fluid pressure to the braking force generation elements; and
   - an auxiliary hydraulic conduit that is connected to the brake fluid pressure generating elements and supplies the brake fluid to the main hydraulic conduit in order to increase the braking forces that the braking force generation generate,
   - wherein the rotary pump is disposed such that the suction port can take in the brake fluid on the brake fluid pressure generating elements side through the auxiliary hydraulic conduit and the discharge port can discharge the brake fluid toward the braking force generation elements through the main hydraulic conduit.

* * * * *